United States Patent [19]

Loukonen

[11] 4,209,041
[45] Jun. 24, 1980

[54] FLUID PRESSURE RESPONSIVE ACCESSORY EQUIPMENT

[76] Inventor: Ernest W. Loukonen, 6920 E. 10th St., Long Beach, Calif. 90815

[21] Appl. No.: 890,048

[22] Filed: Mar. 27, 1978

Related U.S. Application Data

[63] Continuation-in-part of Ser. No. 707,192, Jul. 21, 1976, abandoned.

[51] Int. Cl.² .............................................. F16L 55/04
[52] U.S. Cl. ...................................... 138/30; 116/266; 116/270; 137/556; 138/104
[58] Field of Search ..................... 29/454; 138/30, 104; 220/85 B; 73/40.5 R; 116/114 PV, 266, 270, DIG. 8; 137/556, 593

[56] References Cited

U.S. PATENT DOCUMENTS

| | | | |
|---|---|---|---|
| 2,630,834 | 3/1953 | Weber et al. | 138/30 |
| 3,744,527 | 7/1973 | Mercier | 138/30 |
| 3,893,485 | 7/1975 | Loukonen | 138/30 |

Primary Examiner—Frederick R. Schmidt
Attorney, Agent, or Firm—Boniard I. Brown

[57] ABSTRACT

A hydraulic pressure responsive accessory, such as a cavitation eliminator, for a hydraulic system and a replacement bladder assembly for the accessory. The accessory comprises a cartridge having an inlet for connection to a hydraulic system, and contains a gas filled flexible bladder which compresses and expands in response to pressure fluctuations in the system. This bladder is removably secured within the cartridge in a unique way which permits easy removal of a bladder in the field when worn and replacement of the bladder by that of the present replacement bladder assembly. Shield means are provided between the bladder and a grid overlying casing inlet openings to protect the bladder from impact damage, and means connected with the shield provide indication of excess bladder pressure or automatic release of excess pressure.

23 Claims, 7 Drawing Figures

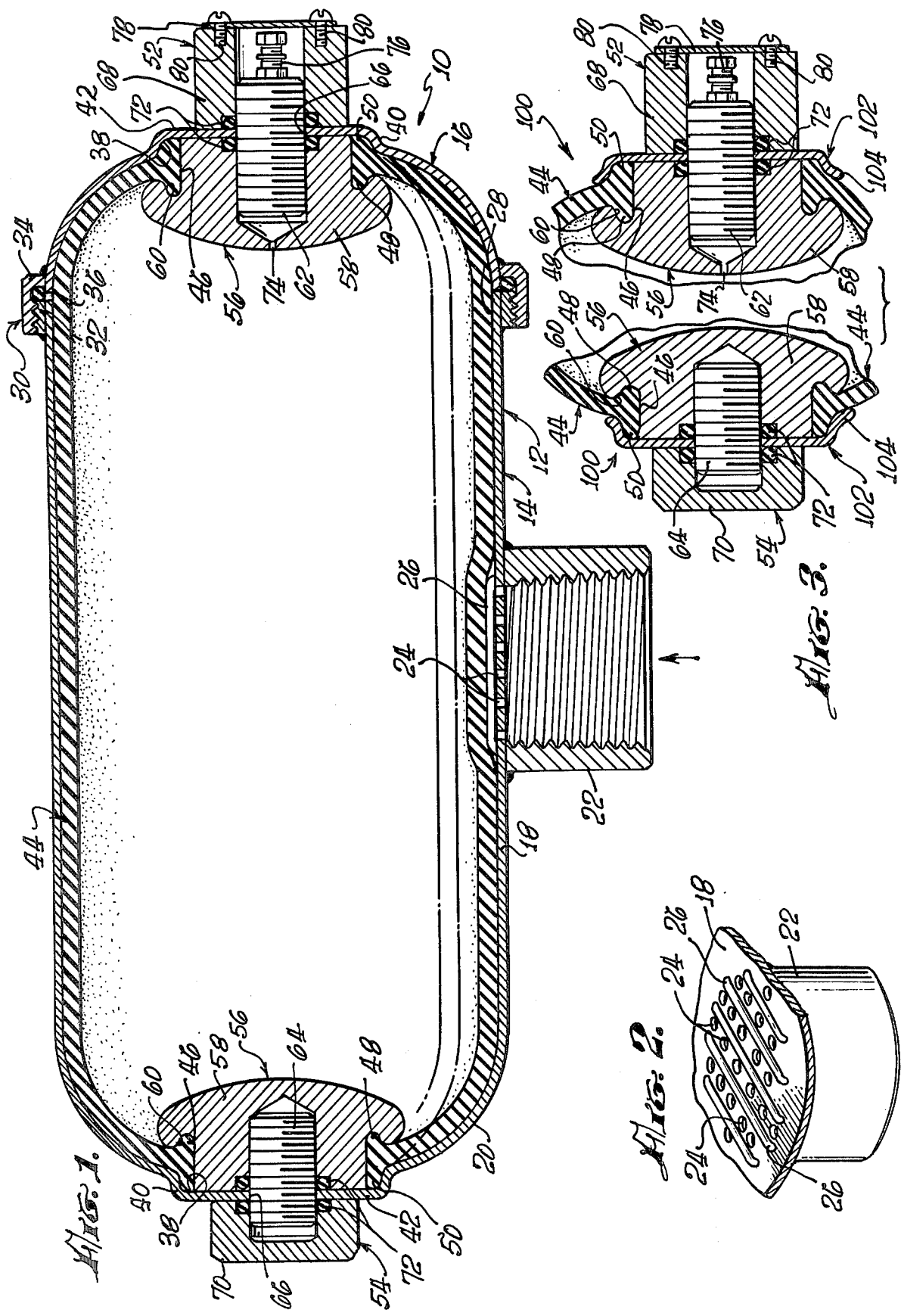

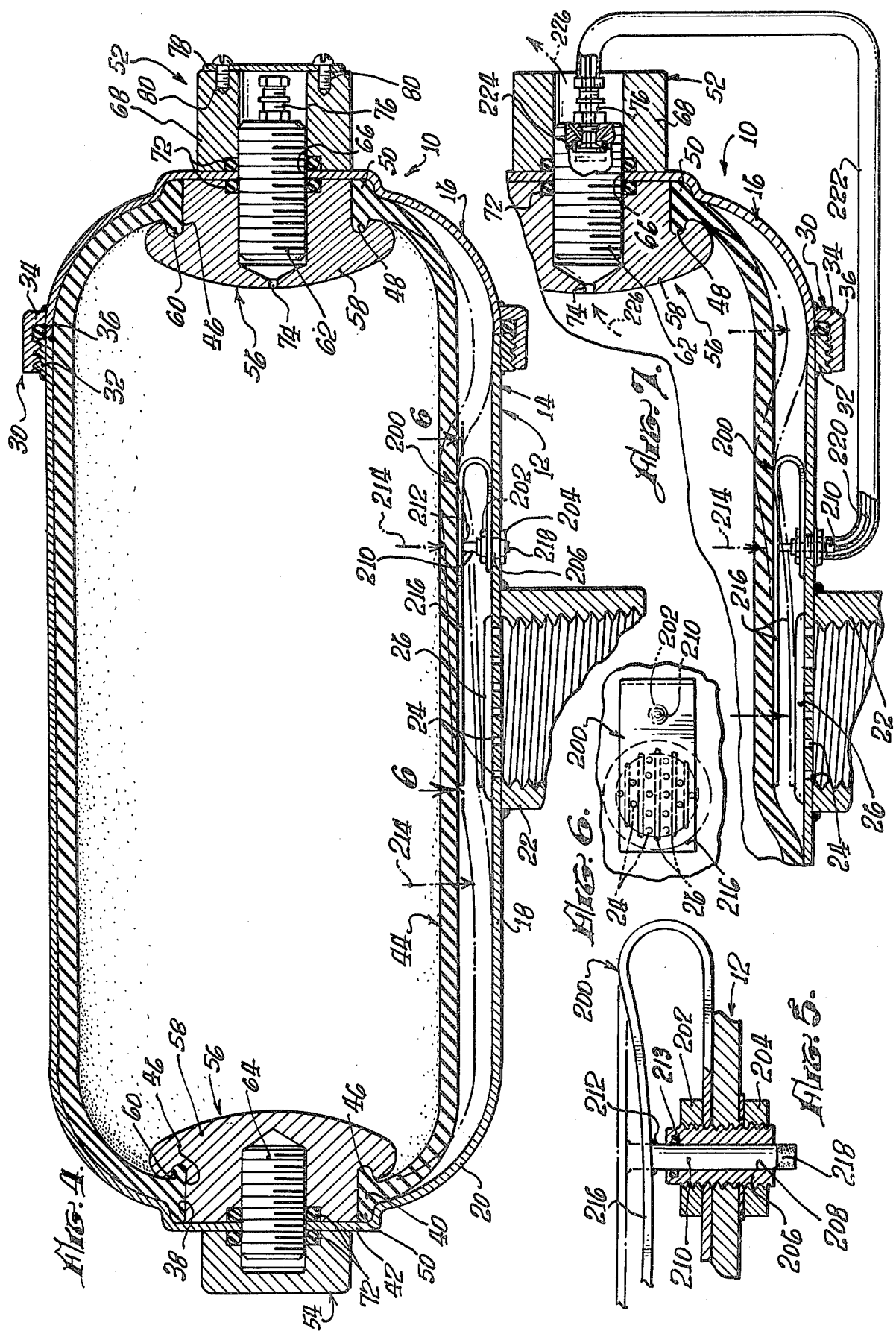

FLUID PRESSURE RESPONSIVE ACCESSORY EQUIPMENT

RELATED APPLICATION

This application is a continuation-in-part of application Ser. No. 707,192, filed July 21, 1976, now abandoned.

The invention is described in the context of a cavitation eliminator although it may be adapted for other uses, such as a pulsation dampener, shock arrestor, or the like.

BACKGROUND OF THE INVENTION

1. Field of the Invention

This invention relates generally to hydraulic system accessories, such as cavitation eliminators, pulsation dampeners, shock arrestors, and the like. More particularly, the invention relates to an improved hydraulic system accessory of this class containing a gas filled, hydraulic pressure responsive bladder which is easily removable and replaceable in the field when worn.

2. Discussion of the Prior Art

As will appear from the ensuing description, the improvements of this invention may be utilized to advantage in a variety of hydraulic system accessories of the class described, such as those mentioned above, i.e., cavitation eliminators, pulsation dampeners, shock arrestors, and the like. However, the invention is primarily concerned with, and will be described in the context of, a cavitation eliminator.

As is well known to those versed in the field of hydraulic systems and equipment, cavitation is a problem which is often encountered in a variety of hydraulic systems, and tends to cause damage to certain types of hydraulic machines. For example, many kinds of reciprocating pumps tend to produce cavitation during their suction strokes, and such cavitation tends to damage the pumps and/or their prime movers.

A cavitation eliminator is utilized to avoid this cavitation problem and its adverse consequences. Simply stated, a cavitation eliminator comprises a casing with an inlet for connection to a hydraulic system and containing a flexible gas filled bladder. Under normal operating conditions of the hydraulic system, the hydraulic pressure in the system acts on the bladder to maintain the bladder in a partially collapsed or compressed configuration, wherein the gas pressure within the bladder balances the hydraulic fluid pressure on the outside of the bladder. When cavitation occurs in the hydraulic system, the hydraulic fluid pressure acting on the bladder diminishes. Under these conditions, the pressurized gas within the bladder expands the bladder outwardly, thereby displacing hydraulic fluid from the casing of the cavitation eliminator back into the hydraulic system thereby immediately filling the void produced by cavitation and hence, eliminating cavitation.

A wide variety of such cavitation eliminators have been devised. This invention is concerned with a problem which is frequently encountered in the use of the existing cavitation eliminators. The problem referred to resides in the fact that the bladder of the cavitation eliminator becomes worn and/or otherwise deteriorates over a period of time. As a consequence, it is necessary to periodically either replace the entire cavitation eliminator or replace its bladder. Replacement of the bladder in the existing cavitation eliminators of which I am aware is extremely difficult and time consuming to accomplish for the reason that such bladder removal and replacement requires cutting of the bladder casing to remove the worn bladder and welding of the casing after assembly therein of the new bladder.

SUMMARY OF THE INVENTION

According to one of its more limited aspects, the present invention provides an improved cavitation eliminator which avoids this bladder removal and replacement problem which is encountered in the use of the existing cavitation eliminators. To this end, the improved cavitation eliminator of the invention has a casing, including a generally cylindrical casing portion closed at one end by an integral end wall and at the other end by a readily removable end cap. Contained within the casing is a flexible gas filled bladder whose ends are releasably secured to the casing end wall and end cap, respectively, by means which are accessible externally of the casing for securing the bladder ends to, and releasing the bladder ends from, the casing end wall and cap. These bladder securing means comprise anchors projecting through openings in the ends of the bladder and threaded studs extending from the anchors to the casing end wall and cap, respectively, to receive nuts threaded on the studs externally of the casing. One of these studs contains a passage opening to the interior of the bladder through which the bladder may be filled with gas.

The bladder is removed from the casing by removing the nuts from the bladder anchor studs, then removing the end cap from the tubular casing portion, and finally withdrawing the bladder from this casing portion through its open end. The new bladder is installed in the casing by reversing this procedure. The open end of the tubular casing portion is sized to permit such removal and replacement of the bladder.

The replacement bladder assembly of the invention comprises the bladder, the bladder securing means, and washers which are interposed between the bladder anchors and nuts of the securing means to retain the bladder ends in secured relation to the securing means during storage and handling of the assembly. The bladder of this assembly is installed in the cavitation eliminator by removing the nuts and washers from the assembly and then installing the bladder in the casing of the cavitation eliminator in the manner explained above.

According to the invention, a hydraulic inlet intermediate the ends of the casing communicates with the casing interior via casing openings covered by spaced grid means to prevent closing off of the inlet openings by expansion of the bladder against the casing wall. Shield means are provided between the grid and the bladder, preferably comprising a shield portion of spring means mounted in the casing, to prevent bladder damage by impacting the grid upon expansion and pulsation of the bladder. Connected with the shield means and responsive to bladder expansion are signal means to indicate excess bladder pressure, preferably a pin extending outwardly through the casing wall. Relief valve means connected with the shield means and responsive to its movement may be provided to relieve excess bladder pressure automatically.

As noted earlier, while the invention is described in the context of a cavitation eliminator, it will become evident as the description proceeds that the replaceable bladder feature of the invention may be utilized in other hydraulic system accessories of the class described.

BRIEF DESCRIPTION OF THE DRAWINGS

FIG. 1 is a longitudinal sectional view through a cavitation eliminator according to the invention;

FIG. 2 is a fragmentary perspective view of the hydraulic fluid inlet of the cavitation eliminator casing;

FIG. 3 is a longitudinal section view, partially broken away, showing both end portions of the replacement bladder assembly of the invention;

FIG. 4 is a longitudinal sectional view, similar to the view of FIG. 1, and further showing a shield-spring device utilized with the invention;

FIG. 5 is an enlarged fragmentary view, showing details of the spring shield and signal pin devices of the cavitation eliminator of FIG. 4;

FIG. 6 is a fragmentary plan view, taken at line 6—6 in FIG. 4; and

FIG. 7 is a partial longitudinal sectional view, similar to a portion of FIG. 4, showing a modified form of the cavitation eliminator of FIG. 4, and a relief valve arrangement which may be utilized with the invention.

DESCRIPTION OF THE PREFERRED EMBODIMENT

Referring first to FIGS. 1 and 2, there is illustrated a hydraulic pressure responsive accessory 10 for a hydraulic system which, in this case, is a cavitation eliminator. This cavitation eliminator has a generally tubular casing 12 including a tubular casing portion 14 and a removable end cap 16. Casing portion 14 has a cylindrical wall 18 and a generally dome shaped end wall 20 closing one end of the casing portion. Intermediate the ends of the casing portion 14 is a hydraulic fluid inlet 22 for connection to a hydraulic system. This inlet comprises an internally threaded sleeve which is welded or otherwise firmly secured to casing wall 18. The inlet 22 encompasses a perforated portion of casing wall 18, this perforated portion defining openings or passages 24 through which hydraulic fluid can enter and exit from the casing interior. A grid spaced from the inner wall of the casing and extending over the perforations or passages 24, is formed by a plurality of rods or wires rigidly joined to the inner casing wall in a grid or rib-like formation spaced from the casing wall. The grid formation serves purposes which are hereinafter indicated.

The end of the tubular casing portion 18 opposite its end wall 20 has an opening 28 of the same diameter as the interior of the casing portion. This opening is closed by the end cap 16. End cap 16 has a generally dome shape similar to that of the casing end wall 20 and is releasably secured to the open end of the casing portion 18 by coupling means 30. The illustrated coupling means comprises a threaded coupling including an externally threaded coupling ring 32 surrounding and welded or otherwise rigidly joined to the open end of the casing portion 18 and an internally threaded coupling ring 34 surrounding and welded or otherwise rigidly joined to the open side or end of the end cap 16. The end cap 16 is joined to the casing portion 18 by threading the cap ring 34 on the casing ring 32. An O-ring 36 provides a liquid tight seal between the casing portion and end cap.

For reasons which will appear presently, the casing end cap 16 and end wall 20 are shaped to define at their inner sides coaxial circular recesses 38 bounded circumferentially by annular side walls 40 and at their outer sides or ends by transverse walls 42.

Within the casing 12 is a flexible gas filled bladder 44. This bladder has a wall with a generally cylindrical central portion and generally dome shaped ends, such that the bladder conforms closely to the interior of the casing 12. Extending through the ends of the bladder 44 are circular openings 46 bounded circumferentially by axially extending inner and outer flanges or beads 48 and 50. The outer bladder beads 50 project into the casing end recesses 38 in radial seating contact with the annular recess side walls 40, as shown.

The ends of the bladder 44 are releasably secured to the casing end cap 16 and end wall 20 by securing means 52 and 54, respectively. Each of these securing means comprises a generally mushroomed shaped anchor 56 positioned within the corresponding end of the bladder 44. Each anchor 56 has a shank which extends through and fits snugly within the adjacent bladder end opening 46 and an enlarged head 58 at the inner end of the shank which extends laterally over and contains an outwardly opening annular groove 60 for receiving the adjacent inner bladder bead 48. The outer ends of the anchor shanks seat against the transverse wall 42 of the casing recesses 38.

Coaxially threaded in and extending from the outer ends of the anchors 56 of the bladder securing means 52, 54, are threaded studs 62 and 64, respectively. These studs extend, with a slight clearance, through openings 66 in the transverse walls 42 of the casing recesses 38. Threaded on the outer end of stud 62 externally of the casing 12, is a cylindrical nut 68. Threaded on the outer end of stud 64, externally of the casing 12, is a generally capped shape nut 70. These nuts are tightened firmly against the transverse walls 42 to firmly clamp these walls between the nuts and the bladder anchor 56. Seal rings 72 are placed in the anchors and nuts, as shown, to seal the bladder securing means 52, 54 to the casing 12.

From the above description of the bladder 44 and the bladder securing means 52, 54, and from the drawings, it is evident that the ends of the bladder 44 are firmly but releasably secured to the casing end cap 16 and end wall 20 by virtue of the engagements of the bladder beads 48, 50 in the anchor grooves 60 and casing recesses 38, respectively. It is further evident that the bladder 44 is easily removable from and replaceable in the casing 12. Thus, removal of the bladder is accomplished by first removing the bladder securing nuts 68, 70, which are accessible externally of the casing 12 for this purpose, then removing the casing end cap 16, and finally withdrawing the bladder from the tubular casing portion 14 through its end opening 28. Installation of the bladder in the casing is accomplished by reversing this procedure. It is evident that the end opening 28 of the tubular casing portion 14 is sized to permit such removal and replacement of the bladder.

As noted earlier, the bladder 44 is adapted to be filled with gas. To this end, a passage 74 extends through the bladder anchor stud 62 and its anchor 56 for filling the bladder with gas from any suitable source (not shown). The filling passage 74 is sealed or closed by a screw or valve 76 at the outer end of the stud 62. A closure plate 78, removably secured by screws 80 to the outer end of the nut 68, shields the filling passage 74 and a ceiling screw or valve 76 against dirt, moisture, and the like.

In the utilization of the cavitation eliminator 10, inlet 22 is connected to the hydraulic system (not shown) in which cavitation is prone to occur. The bladder 44, which will normally occupy its full line position in FIG. 1, will be deflected or compressed inwardly, by the hydraulic fluid pressure in the hydraulic system, as indicated in broken lines in FIG. 1. This inward deflection or compression of the bladder continues until the internal gas pressure in the bladder equalizes the external hydraulic fluid pressure on the bladder. During operation of the hydraulic system, fluctuations in hydraulic fluid pressure will cause the bladder to deflect further inwardly and expand outwardly, as the pressure increases and decreases. In the event of cavitation in the hydraulic system, produced by the suction stroke of a pump in the system, for example, the internal gas pressure in the bladder will cause the bladder to instantaneously expand toward its full line position of FIG. 1 to displace hydraulic fluid into the cavitation void and thereby effectively prevent cavitation. This basic cavitation eliminating operation or function of a cavitation eliminator is well known in the art and hence need not be explained in any greater detail in this disclosure.

The grid means or rib-like formation formed by rods or wires 26, hereinabove described, prevents the bladder from contacting and seating against the inner surface of casing wall 18 and thus sealing and closing off the passages or openings 24, which closure would prevent fluid from exiting through these openings, thus at times preventing effective operation of the cavitation eliminator. Such closure of the passages or openings 24 could otherwise occur by the expansion of bladder 44 by its internal gas pressure, in response to cavitation in the hydraulic system in which the pressure-responsive accessory of the invention is connected, and could thus prevent the proper exiting of hydraulic fluid through the openings 24 into the hydraulic system, and thus thwart the function of the cavitation eliminator in preventing cavitation in the system.

As noted earlier, during a prolonged period of operation of the cavitation eliminator, its bladder 44 will suffer wear and/or other deterioration, thereby requiring periodic replacement of the bladder. One contribution of this invention resides in the unique construction and arrangement of the cavitation eliminator 10, whereby the bladder 44 may be easily removed and replaced in the manner heretofore explained. This removal and replacement of the bladder obviously may be readily accomplished directly at the site where the cavitation eliminator is being used.

Another contribution of the invention resides in a replacement bladder assembly for the cavitation eliminator. This bladder assembly is shown in fragmentary fashion at 100 in FIG. 3. Bladder assembly 100 comprises a bladder 44 and the bladder securing means 52, 54. In addition, the bladder assembly comprises a pair of washers 102 which are interposed between the bladder anchors 56 and the nuts 68, 70 of the securing means. These washers effectively replace the walls 40, 42 of the casing recesses 38 and are bounded by circumferential flanges 104 which engage about the outer bladder beads 50, in somewhat the same way as the casing recess side walls 40 to effect firm gripping of the bladder ends between the washers and the bladder anchors 56, as shown in FIG. 3.

In practice, the bladder assembly 100 is assembled, and its bladder 44 is filled with gas, at the factory. The bladder is then shipped to a job site having a cavitation eliminator 10. When it becomes necessary to replace the bladder of a cavitation eliminator, the bladder is removed from the cavitation eliminator in the manner explained earlier. The bladder of the bladder assembly 100 is then installed in the cavitation eliminator by removing the nuts 68, 70 of the bladder securing means 52, 54 and the washers 102 and then installing the bladder within the casing 12 of the cavitation eliminator in the manner explained earlier.

In view of the foregoing, it will be understood that utilizing the present invention, only the bladder and at most the bladder assembly components, need be shipped to a site where a bladder replacement is needed, which site may be at a great distance from a source of supply of the needed bladder.

The bladder or bladder assembly may be shipped by the most efficient means, such as by special aircraft shipment, and the bladder or components of the bladder assembly, can be quickly and relatively conveniently installed, thereby avoiding excessive delays, system and equipment down-time, labor expense resulting from idle personnel, and other expensive results of failure of a damaged bladder, etc.

As noted earlier, while the invention is described in the context of a cavitation eliminator, the removable bladder feature and replacement bladder assembly of the invention may be utilized in other types of hydraulic fluid system accessories of the class described, such as pulsation dampeners, shock arrestors and the like.

In the operation of the fluid pressure-responsive accessory or cavitation eliminator of the invention, the bladder expands and contracts in response to pressure changes in the system in which the accessory or device of the invention is connected, causing the bladder to expand and contract rapidly and to forcibly impinge upon the grid of rods 26.

Such working or impinging upon the grid formed by the rods 26 result in relatively rapid bladder damage and short service life, the bladder becoming damaged, and torn long before the extent of its normal service life.

FIG. 4 through 6 illustrate a preferred arrangement for preventing such bladder damage, extending bladder service life and for providing indication of bladder pressure above pre-determined pressure which could cause damage. A flat leaf spring 200 is secured by nuts 202, 204 and threaded sleeve fitting 206 to the casing wall 18, as shown. The spring 200 has a bent configuration, and its outer, relatively flat portion 216 is positioned between the bladder and the grid defined by rods 26. Secured, as by welding at 212, to spring portion 216 is a pin 210 which is finally mounted in axial opening 208 of fitting 206, as shown in FIG. 5. Fluid pressure sealing is provided by an O-ring seal 213 in an appropriate groove in fitting 206.

With bladder inflation such as from the solid line configuration to the phantom line configuration shown in FIG. 4, resulting from pressure drops, pulsations, or cavitations in the hydraulic system to which the device of FIG. 4 communicates via inlet 22, the bladder is urged against flat spring portion 216 which is depressed against the urging of the spring to the position shown in phantom lines in FIG. 4 wherein it engages the grid of rods 26. Shield portion 216 of the spring thus receives the pressure, pulsations or hammering of the bladder in response to pressure changes in the hydraulic system, while the grid prevents blockage of openings 24 to allow hydraulic fluid to enter and exit from the casing interior, so that the accessory device can properly perform its function, such as cavitation elimination.

With the depression of the flat shield spring portion 216 against the grid rods 26, the pin 210 is moved outwardly to its position shown in FIG. 5, wherein its end portion 218 extends outwardly. The outward extension of pin end portion 218, which is preferably conspicuously colored or otherwise marked, it is readily observed by an operator or inspector to provide indication and warning that the internal bladder pressure is above a pre-determined desired pressure. With such warning, appropriate action may be taken to reduce the bladder pressure to an appropriate pressure for improved service life and performance.

Illustrated in FIG. 7 is an arrangement similar to that of FIGS. 4 through 6, in which further includes means for automatically relieving bladder pressure above a pre-determined desired pressure. A cable 220 is secured to the outer end of pin 210, with its other end operatively attached to a relief valve 224, the cable being slidable in a tube 222. When the pin 210 is urged outwardly in the manner described above in relation to the embodiment shown in FIGS. 4 through 7, cable 10 urges relief valve 224 to its open configuration shown in broken lines, thus relieving pressure from the bladder to the desired pressure at which the bladder will not impact or hammer the spring against the grid, and which will result in desired extended service life.

The inventor claims:

1. A hydraulic system fluid pressure responsive accessory, such as a cavitation eliminator, comprising:
    a liquid tight casing including a generally cylindrical tubular casing portion having an end wall defining an end opening in said casing portion and an opposite end opening of substantially the same diameter as the interior of said casing portion, and end cap closing means releasably secured to said casing portion and defining an opening,
    a flexible bladder within the casing generally conforming in configuration to the interior of the casing and in contact therewith when inflated,
    first securing means releasably anchoring one end of said bladder to said casing end wall,
    said securing means including an anchor member engaging the bladder and stud means extending through said end wall opening,
    an annular resilient sealing element in an annular space between the anchor member and the casing end wall about the end wall opening to retain pressure in the bladder,
    second securing means releasably anchoring the other end of said bladder to said end cap,
    said securing anchor means including an anchor member engaging the bladder and stud means extending through the end cap opening,
    an annular resilient sealing element in an annular space between the anchor member and the end cap about the end cap opening to retain pressure in the bladder,
    each of said first and second securing means including means accessible externally of said casing for releasing and securing the corresponding bladder end relative to said casing,
    means for filling the bladder with gas, and
    hydraulic inlet means connected with said tubular casing portion intermediate its ends and communicating with the casing interior, whereby upon the occurrence of cavitation in the hydraulic system the gas pressure in the bladder expands to displace hydraulic fluid through the inlet means to eliminate cavitation.

2. The subject matter of claim 1, wherein:
    said end wall and end cap have interior generally annular recesses about the casing and end wall openings, respectively, and bounded circumferentially by annular side walls and axially by transverse walls,
    said bladder has respective end openings bounded circumferentially by inner and outer axially projecting shoulders,
    said bladder shoulders project into said casing and end wall recesses, respectively, in radial seating contact with said recess side walls,
    said anchor members are within the respective ends of said bladder and have shanks extending through said respective bladder openings and seating at their outer ends against said transverse recess walls and enlarged heads on the inner ends of said shanks projecting laterally over and having annular grooves receiving said inner bladder shoulders,
    said studs are threaded and extend coaxially from the outer ends of said shanks through said transverse recess walls to the exterior of said casing, and said securing means includes nuts threaded on the outer ends of said studs, and
    said filling means comprises a filling passage extending axially through the anchor and stud on said end cap.

3. The subject matter of claim 2, wherein
    said end cap closing means comprises threads on said casing portion about said open end thereof and threads on said end cap engaging said casing threads for assembly and separation of said end cap and casing portion by relative rotation thereof.

4. The subject matter of claim 3, wherein:
    the nut on the end cap stud has an opening through its outer end providing access to said filling opening, and a removable end plate sealing said nut opening.

5. A fluid pressure responsive accessory according to claim 1, and further including:
    a perforated casing wall portion communicating with said hydraulic inlet,
    grid means secured to and extending in spaced relation across the perforated casing wall portion to prevent closing off of flow through the hydraulic inlet by expansion of the bladder against the perforated casing wall portion by inflation of the bladder by bladder pressure above a predetermined pressure.

6. A hydraulic system fluid pressure responsive accessory, such as a cavitation eliminator, comprising:
    a liquid tight casing including a generally cylindrical tubular casing portion having an end wall closing one end of said casing portion and an opposite end opening of substantially the same diameter as the interior of said casing portion, and an end cap closing means releasably secured to said casing portion,
    a flexible bladder within the casing generally conforming in configuration to the interior of the casing and in contact therewith when inflated,
    means releasably securing one end of said bladder to said casing end wall,
    means releasably securing the other end of said bladder to said casing end cap,
    each of said securing means including means accessible externally of said casing for releasing and securing the corresponding bladder end from and to said casing,
    means for filling the bladder with gas,
    hydraulic inlet means connected with said tubular casing portion intermediate its ends and communicating with the casing interior, whereby upon the occurrence of cavitation in the hydraulic system the gas pressure in the bladder expands to displace hydraulic fluid through the inlet means to eliminate cavitation, and means movable by bladder expansion by predetermined bladder pressure, to an indicating position external of the casing to provide indication of the predetermined bladder pressure.

7. A hydraulic system fluid pressure responsive accessory, such as a cavitation eliminator, comprising:

a liquid tight casing including a generally cylindrical tubular casing portion having an end wall closing one end of said casing portion and an opposite end opening of substantially the same diameter as the interior of said casing portion, and an end cap closing means releasably secured to said casing portion, a flexible bladder within the casing generally conforming in configuration to the interior of the casing and in contact therewith when inflated, means releasably securing one end of said bladder to said casing end wall, means releasably securing the other end of said bladder to said casing end cap, each of said securing means including means accessible externally of said casing for releasing and securing the corresponding bladder end from and to said casing, means for filling the bladder with gas, hydraulic inlet means connected with said tubular casing portion intermediate its ends and communicating with the casing interior, whereby upon the occurrence of cavitation in the hydraulic system the gas pressure in the bladder expands to displace hydraulic fluid through the inlet means to eliminate cavitation, relief valve means, and means connected with the relief valve means and responsive to bladder expansion by a predetermined bladder pressure to operate the relief valve means to relieve the bladder pressure above the predetermined pressure.

8. A replacement bladder assembly for installation in the casing of a fluid pressure responsive accessory, comprising:

a bladder having coaxial end openings bounded circumferentially by inner and outer axially projecting shoulders, anchors in the ends of said bladder having shanks extending through said bladder openings and enlarged heads on the inner ends of said shanks projecting laterally over and having annular grooves receiving said inner bladder shoulders, threaded studs extending coaxially from the outer ends of said anchor shanks, individual washers positioned over said studs outwardly of and disposed in direct axial seating contact with said outer bladder shoulders and bounded circumferentially by flanges surrounding and disposed in direct radial seating contact with said outer bladder shoulders, said washers being configured like end portions of the casing of the accessory, and nuts threaded on said studs for clamping said washers against said anchors and thereby securing said bladder ends between said anchors and washers, whereby the bladder shoulders are protected and the accessory components are maintained in their service configuration for shipment and storage.

9. The subject matter of claim 8, including:

a passage extending through one of said studs for filling said bladder with gas.

10. The subject matter of claim 8, wherein:

said passage is accessible through an opening at the outer end of the nut threaded on said last mentioned stud; and a closure plate removably secured to said latter nut enclosing said opening therein.

11. A hydraulic system fluid pressure responsive accessory, such as a cavitation eliminator, comprising:

a liquid tight casing including a generally cylindrical tubular casing portion having an end wall closing one end of said casing portion and an opposite end opening of substantially the same diameter as the interior of said casing portion, and an end cap closing means releasably secured to said casing portion, a flexible bladder within the casing generally conforming in configuration to the interior of the casing and in contact therewith when inflated, means releasably securing one end of said bladder to said casing end wall, means releasably securing the other end of said bladder to said casing end cap, each of said securing means including means accessible externally of said casing for releasing and securing the corresponding bladder end from and to said casing, means for filling the bladder with gas, hydraulic inlet means connected with said tubular casing portion intermediate its ends and communicating with the casing interior, whereby upon the occurrence of cavitation in the hydraulic system the gas pressure in the bladder expands to displace hydraulic fluid through the inlet means to eliminate cavitation, a perforated casing wall portion communicating with said hydraulic inlet, grid means secured to and extending in spaced relation across the perforated casing wall portion to prevent closing off of flow through the hydraulic inlet by expansion of the bladder against the perforated casing wall portion by inflation of the bladder by bladder pressure above a predetermined pressure, and shield means between the bladder and the grid means and movable against the grid means upon expansion of the bladder in response to predetermined pressure therewithin to prevent bladder damage from forceable engagement with the grid means.

12. A fluid pressure responsive accessory according to claim 11, wherein:

the shield means comprises flat plate means overlying the grid means, and further including:

resilient means adapted to be moved against the grid means by such bladder inflation by said predetermined pressure, and means connected with the flat plate to provide indication of the predetermined pressure within the bladder.

13. A fluid pressure responsive accessory according to claim 11, and further including a replacement assembly including the bladder, wherein:

the bladder has coaxial end openings bounded circumferentially by inner and outer axially projecting shoulders, and further including:

anchors in the ends of said bladder having shanks extending through said bladder openings and enlarged heads on the inner ends of said shanks projecting laterally over and having annular grooves receiving said inner bladder shoulders, threaded studs extending coaxially from the outer ends of said anchor shanks, individual washers positioned over said studs outwardly of and disposed in direct axial seating contact with said outer bladder shoulders and bounded circumferentially by flanges surrounding and disposed in direct radial seating contact with said outer bladder shoulders, and nuts threaded on said studs for clamping said washers against said anchors and thereby securing said bladder ends between said anchors and washers.

14. A fluid pressure responsive accessory according to claim 11, and further including: means connected with the shield means and responsive to said bladder expansion to relieve pressure in the bladder above said predetermined pressure.

15. A fluid pressure responsive accessory according to claim 14, wherein:

said responsive means connected with the shield means comprises a pin secured to the shield means and extensible outwardly through the casing to indicate the existence of the predetermined bladder pressure.

16. A fluid pressure responsive accessory according to claim 11, wherein:

said shield means comprises spring means mounted within the casing and having a shield portion overlying the grid means, the spring means being deformable to position the shield portion against the grid means upon bladder inflation by the predetermined pressure.

17. A fluid pressure responsive accessory according to claim 16, wherein:

said spring means is bent leaf spring having a portion secured to the casing wall and having a flat shield portion overlying the grid means.

18. A fluid pressure responsive accessory according to claim 11, and further including:

relief valve means operable to relieve pressure within the bladder, and means interconnecting the valve means and the shield means to relieve bladder pressure above the predetermined pressure in response to the movement of the shield means.

19. A fluid pressure responsive accessory according to claim 18, wherein:

the interconnecting means comprises mechanical means interconnecting the valve means and the shield.

20. A hydraulic system fluid pressure responsive accessory, such as a cavitation eliminator, comprising:

a liquid tight casing including a generally cylindrical tubular casing portion having an end wall defining an end opening in said casing portion and an opposite end opening of substantially the same diameter as the interior of said casing portion, and end cap closing means releasably secured to said casing portion and defining an opening, a flexible bladder within the casing generally conforming in configuration to the interior of the casing and in contact therewith when inflated, first securing means releasably anchoring one end of said bladder to said casing end wall, said securing means including an anchor member engaging the bladder and stud means extending through said end wall opening, sealing means adjacent the casing end wall and the anchor member about the end wall opening to retain pressure in the bladder, second securing means releasably anchoring the other end of said bladder to said end cap, said securing means including an anchor member engaging the bladder and stud means extending through the end cap opening, sealing means adjacent the end cap and the second anchor member about the end cap opening to retain pressure in the bladder, at least one of said securing means comprising a nut, sealing means adjacent the nut and about the end opening to retain pressure in the bladder, means for filling the bladder with gas, and hydraulic inlet means connected with said tubular casing portion intermediate its ends and communicating with the casing interior, whereby upon the occurrence of cavitation in the hydraulic system the gas pressure in the bladder expands to displace hydraulic fluid through the inlet means to eliminate cavitation.

21. A fluid pressure responsive accessory according to claim 20, and further including:

first and second nut means of said first and second securing means, respectively, accessible externally of said casing for releasing and securing the bladder ends relative to said casing, sealing means adjacent the end cap and the second nut means about the end wall opening to retain pressure in the bladder, and sealing means adjacent the casing end wall and the first nut means about the end cap opening to retain pressure in the bladder.

22. A fluid pressure responsive accessory according to claim 20 or claim 21, wherein:

each of said sealing means adjacent an anchor member is an O-ring resilient seal in an annular groove in the anchor member, and each of said sealing elements adjacent a nut is an O-ring resilient seal in an annular groove in the nut.

23. A fluid pressure responsive accessory according to claim 1 or claim 2, or claim 20 wherein:

said anchor members are similar in configuration and the end wall and end cap are of similar configuration, thus to present similar structural configurations to the respective end portions of the expanding and contracting bladder to effect symmetric bladder contraction and expansion to minimize bladder wear and damage.

* * * * *